United States Patent [19]
Voit

[11] Patent Number: 5,132,016
[45] Date of Patent: Jul. 21, 1992

[54] SOLVENT PRESTRIPPING IN A ZR/HF SEPARATION LIQUID-LIQUID EXTRACTION (LLX) CIRCUIT

[75] Inventor: Donald O. Voit, Ogden, Utah
[73] Assignee: Westinghouse Electric Corp., Pittsburgh, Pa.
[21] Appl. No.: 606,649
[22] Filed: Oct. 31, 1990
[51] Int. Cl.$^5$ .............................................. B01D 11/04
[52] U.S. Cl. ................... 210/639; 210/634; 210/511; 423/70
[58] Field of Search ............ 423/70, 79, 112, 589, 423/64, 139, 71, 305; 210/634, 639, 511

[56] References Cited
U.S. PATENT DOCUMENTS
3,006,719 10/1961 Miller ................................ 423/70

Primary Examiner—Frank Spear
Attorney, Agent, or Firm—J. C. Valentine

[57] ABSTRACT

A process for producing nuclear grade zirconium and a liquid-liquid separation circuit for separating zirconium from hafnium are provided. The process employs an aqueous feed of $ZrOCl_2$ in the presence of thiocyanate, an organic solvent and acid and a series of high mass transfer efficiency pulse columns in which are conducted the iron extraction, hafnium extraction, zirconium stripping, hafnium scrubbing and zirconium and hafnium thiocyanate recovery processes required to produce substantially hafnium-free nuclear grade zirconium. A feed zone mixer-settler separates thiocyanate and zirconium injection points and permits the prestripping of zirconium prior to the main stripping operation. All of the scrubbed solvent and the thiocyanate are regenerated. Higher concentrations, smaller flows, and compact equipment result in the present process requiring substantially reduced in-process inventories as compared to previously known Zr/Hf separation processes. The Zr/Hf separation process described herein also achieves further processing efficiencies not produced by the prior art.

17 Claims, 2 Drawing Sheets

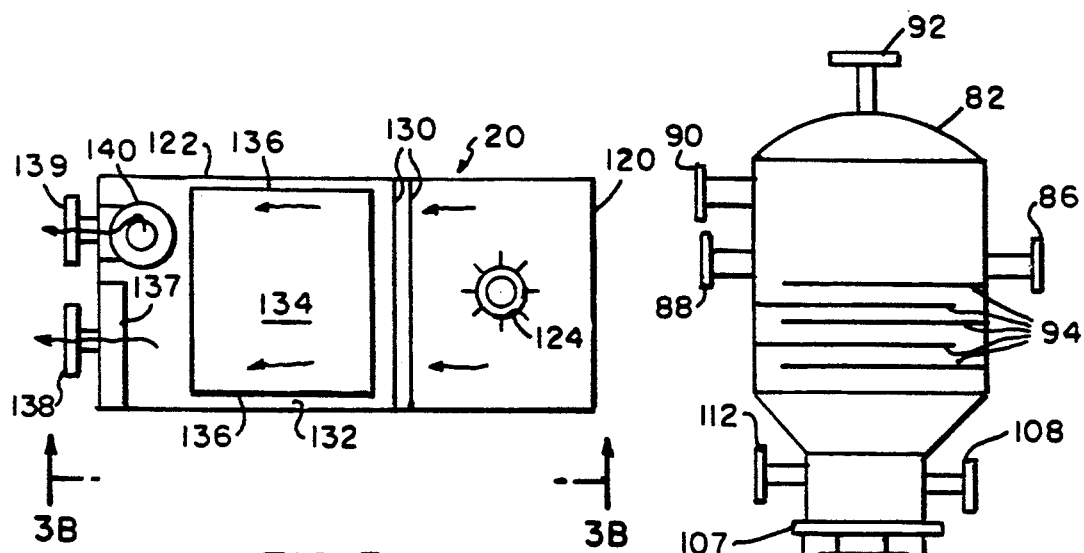
FIG. 3A
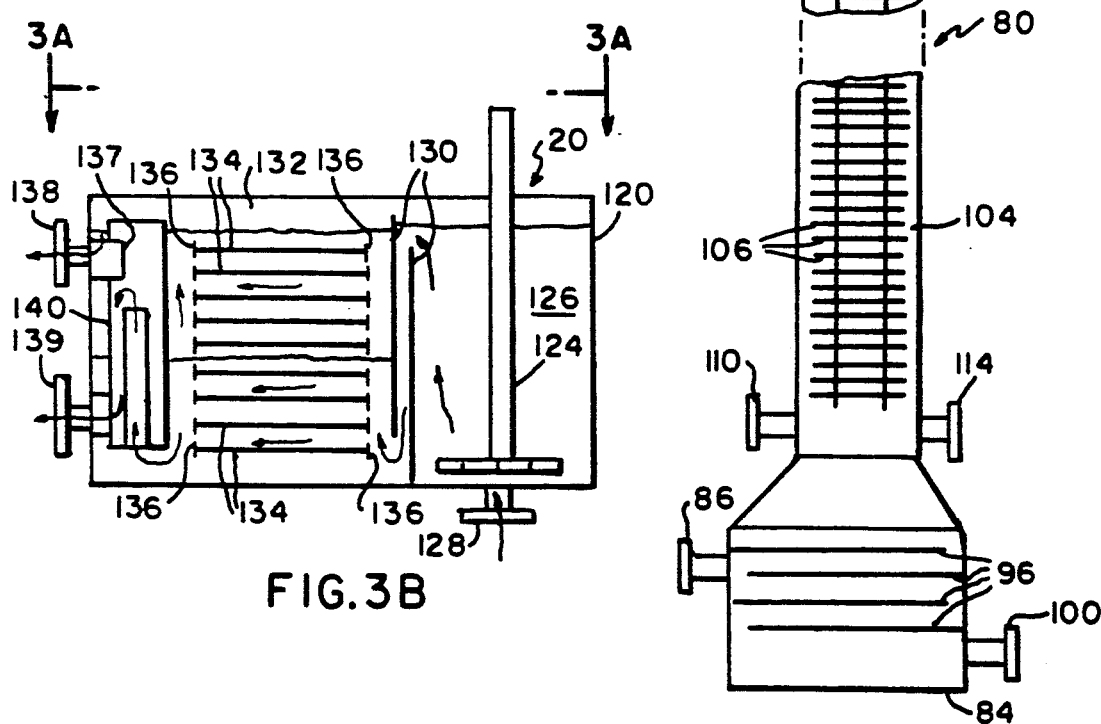
FIG. 3B
FIG. 2

SOLVENT PRESTRIPPING IN A ZR/HF SEPARATION LIQUID-LIQUID EXTRACTION (LLX) CIRCUIT

TECHNICAL FIELD

The present invention relates generally to processes for the separation of zirconium (Zr) from hafnium (Hf) and specifically to a liquid-liquid extraction method of separating zirconium from hafnium.

BACKGROUND ART

Zirconium is widely used today as cladding in nuclear fuel rods. However, the zirconium-containing ores that are the best source of this zirconium also contain hafnium. Separation of the zirconium from the hafnium must be accomplished so that the zirconium is in a form in which it can be used for nuclear fuel rods or for other purposes requiring substantially hafnium-free zirconium. Nuclear grade zirconium standards typically require no more than 30 ppm hafnium.

Several processes for the production of hafnium-free zirconium are known. One known process employs a zirconium/hafnium separation process, which uses tributyl phosphate (TBP) solvent and a zirconyl nitrate feed. Another known zirconium/hafnium separation process is a distillation based separation process. A third zirconium/hafnium separation process, which is currently used to produce most of the nuclear grade zirconium available for use as fuel rod cladding and the like, was developed by the United States Bureau of Mines and is described in the publication entitled "Zirconium-Hafnium Separation," by W. A. Stickney, Bureau of Mines Report of Investigations 5499 (1949). In this process, zirconium and hafnium are separated from a chloride media using a thiocyanate complexing agent and a methylisobutyl ketone (mibK) solvent.

The U.S. Bureau of Mines process requires the preparation of a zirconium feed by dissolving $ZrCl_4$ in water. This feed is highly acid because of the presence of HCl produced by hydrolysis, and the zirconium concentration is low because of the high acidity of the system. The zirconium feed is filtered, and iron, which must be removed, is removed by contact with mibK in a packed column to produce an iron free feed. The iron loaded mibK is washed with water, and the solvent regenerated. The iron free feed is mixed with ammonium thiocyanate ($NH_4SCN$) and aqueous solution recycled from a stripper. The washed mibK, the stripper aqueous and the iron-free Zr feed are combined to form the extractor aqueous. Solvent, which is a 50/50 mixture of solvent from the thiocyanate recovery system, and scrubbed mibK is fed to an extractor. The aqueous stream exiting the extractor is then fed to a zirconium raffinate thiocyanate recovery section. Thiocyanate is extracted as HSCN by the addition of HCl, and the aqueous zirconium raffinate is steam stripped to recover the 2% dissolved mibK. Finally, zirconium is precipitated as a 5/2 sulfate for additional purification and calcining.

In the foregoing process, the aqueous zirconium feed is typically run through a liquid-liquid type extraction circuit including a series of packed columns where the aqueous zirconium-containing liquid flows countercurrent to an organic liquid, usually mibK solvent, which typically flows continuously. However, these packed columns suffer from some significant disadvantages. They are difficult to control, and there is little or no relationship between the flow rate and column transfer capability.

While the aforementioned process is an effective method for producing substantially hafnium-free zirconium, it is somewhat inefficient. The solvent leaving the extractor can contain up to 50% of the zirconium in the feed. This zirconium must be stripped with HCl and returned as the stripper recycle. Scrubbing of the stripped solvent with sulfuric acid to remove hafnium is then required. The hafnium raffinate produced is first contacted with mibK to recover the thiocyanate present and then steam stripped to remove mibK before precipitation with ammonia. Additionally, $NH_4Cl$, which is generated as a waste product, must be disposed of.

U.S. Pat. Nos. 3,006,719 and 3,069,232 are directed to improvements of the Bureau of Mines zirconium extraction process. U.S. Pat. No. 3,006,719 is directed specifically to the removal of iron impurities from the Zr/Hf feed, and U.S. Pat. No. 3,069,232 is directed to the recovery of hafnium values. Neither of the processes disclosed in these patents, however, improves the efficiency of the zirconium/hafnium separation process to produce nuclear grade zirconium at a lower cost and with smaller in-process inventories than the Bureau of Mines process.

The available, commercial zirconium separation processes employing thiocyanate regeneration systems have not appreciated the importance of system design on the purity of the mibK solvent and the regenerated $NH_4SCN$. As a result, these processes have produced mibK with unacceptably high thiocyanate levels. A concentration significantly below the 0.1M SCN produced by these systems is desirable to insure the production of high quality nuclear grade zirconium.

The prior art, therefore, fails to disclose an efficient extraction process for producing high quality, substantially hafnium-free nuclear grade zirconium. The available prior art processes, moreover, are inefficient and slow, require substantial in-process inventories of mibK and thiocyanate and, as a result, are costly.

SUMMARY OF THE INVENTION

It is a primary object of the present invention, therefore, to provide an efficient and effective process for producing high quality, substantially hafnium-free nuclear grade zirconium which overcomes the disadvantages of the prior art.

It is another object of the present invention to provide a zirconium hafnium separation process that requires substantially lower in-process inventories of methylisobutyl ketone and thiocyanate than existing processes.

It is yet another object of the present invention to provide a zirconium/hafnium liquid-liquid extraction process for producing hafnium-free nuclear grade zirconium.

It is a further object of the present invention to provide a zirconium/hafnium separation liquid-liquid extraction process wherein zirconium is prestripped from a zirconium-containing solvent.

It is yet a further object of the present invention to provide a zirconium/hafnium separation process which substantially reduces the $NH_4Cl$ waste generation.

It is a still further object of the present invention to provide a zirconium/hafnium separation liquid-liquid extraction circuit wherein hafnium raffinate reflux is returned to the zirconium stripper without passing through the hafnium thiocyanate recovery column.

It is a still further object of the present invention to provide a liquid-liquid extraction zirconium/hafnium separation process which is significantly less costly to operate, simpler and requires less processing equipment than prior art processes.

It is yet a still further object of the present invention to provide apparatus for a zirconium/hafnium separation liquid-liquid extraction circuit wherein the mass transferred is related to fluid flow through the circuit.

It is yet an additional object of the present invention to provide a mixer-settler apparatus in a zirconium/hafnium separation liquid-liquid extraction circuit wherein zirconium values are prestripped from a zirconium-containing solvent prior to acid stripping of the zirconium in a stripper column.

The aforesaid objects are satisfied by providing a zirconium/hafnium separation liquid-liquid extraction circuit which is a major modification of the Bureau of Mines thiocyanate/mibK Zr/Hf separation process and which may be carried out in high mass transfer efficiency pulse columns. The process of the present invention employs a high solubility, low acid zirconyl chloride ($ZrOCl_2$)-based feed in place of the conventional zirconium chloride ($ZrCl_4$)-based feed used for prior art Zr/Hf separation processes. The $ZrOCl_2$ feed is first treated to extract any iron and is then directed to a mixer-settler. An ammonium thiocyanate ($NH_4SCN$) feed is also introduced to the mixer-settler, but at a different point from the iron-free $ZrOCl_2$ feed. Stripper aqueous raffinate is mixed with feed and introduced to the mixer-settler. Also feeding the mixer-settler is solvent from a hafnium extractor column. About one half of the zirconium load in the solvent is removed before it feeds a zirconium stripper. The zirconium-containing solvent leaving the mixer-settler is next fed to the stripper column where it is contacted by acid. The solvent then proceeds to a hafnium scrubber, where it is contacted with sulfuric acid. Scrubber raffinate is partially returned to the stripper as reflux. Ammonium thiocyanate is mixed with the mixer-settler aqueous and fed to the extractor column. The aqueous from the extractor is mixed with concentrated HCl and contacted with mibK to recover the thiocyanic acid values. The solvent from a thiocyanate recovery column is returned to the extractor column. A second, smaller thiocyanate recovery column is used to recover the thiocyanate value from the hafnium raffinate. MibK is introduced to this column to extract the thiocyanic acid. The solvent exiting the hafnium thiocyanate recovery column is mixed with solvent from the zirconium stripper and fed to the hafnium scrubber. If desired, the stripper and scrubber can be operated organic continuous. Additionally, the entire scrubbed solvent stream is regenerated.

The process of the present invention is conducted in a liquid-liquid extraction circuit which includes a series of pulse columns of suitable diameters and heights, with expanded diameter disengaging zones at one or both ends as required to expand the dispersed phase settling zone. Liquid is agitated into the columns under the control of a pulse pump, which produces a sine wave shaped displacement. The pulse columns used for the present process permit a substantially greater degree of control over mass transfer and stability. Additionally, the circuit also includes a mixer-settler apparatus to prestrip zirconium values at a stage in the process which achieves greater operating efficiencies than can be achieved with the prior art.

Other objects and advantages will be apparent from the following description, claims and drawings.

BRIEF DESCRIPTION OF THE DRAWINGS

FIG. 2 is a schematic representation of a pulse column suitable for use in the zirconium/hafnium separation process of the present invention; and FIGS. 3A and 3B are, respectively, schematic representations of the top and side of a mixer-settler useful in conducting the process of the present invention.

DESCRIPTION OF THE PREFERRED EMBODIMENTS

Figure 1:
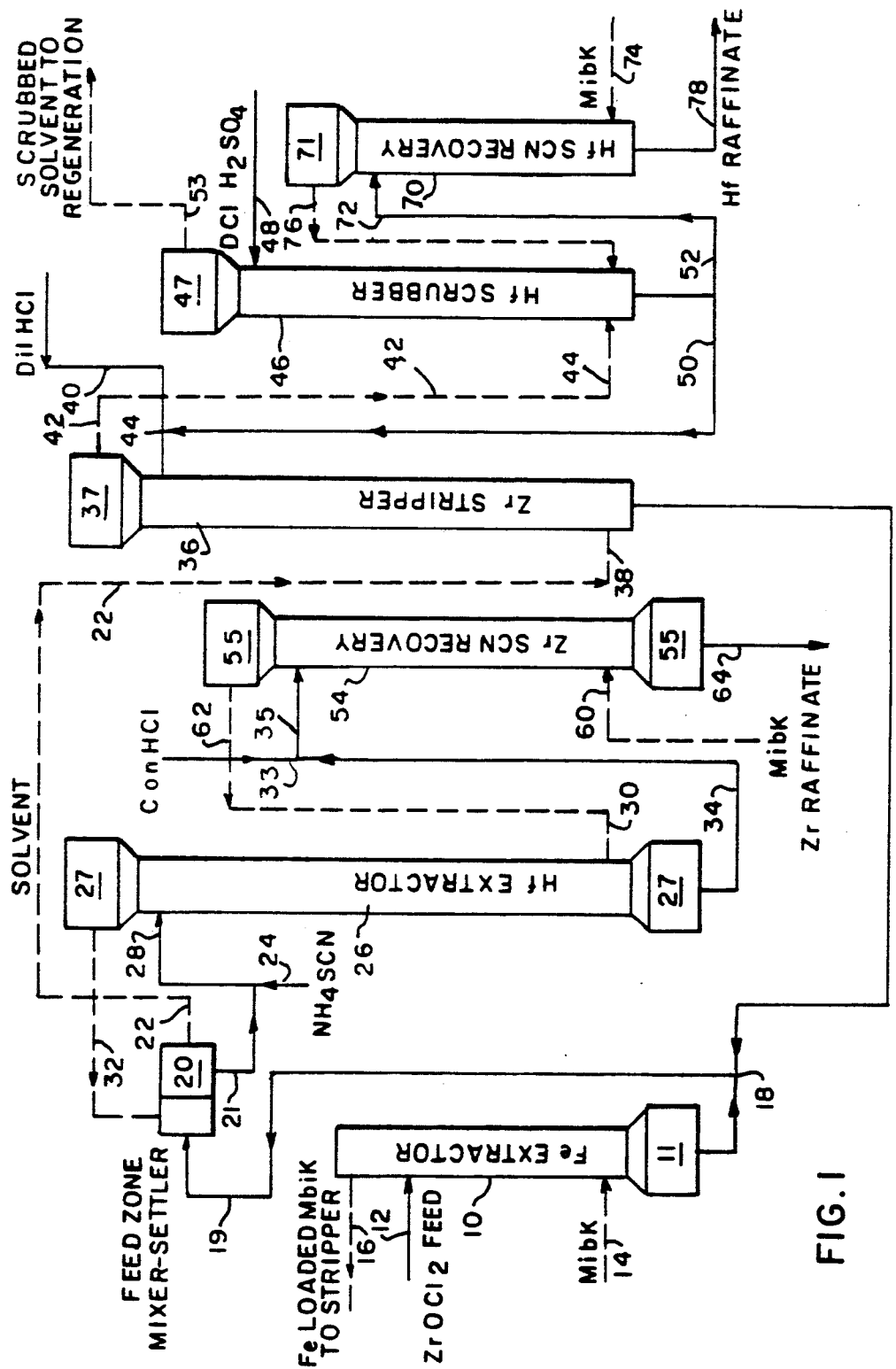
FIG. 1 is a flow sheet which schematically illustrates the process of the present invention.

The zirconium/hafnium separation process of the present invention differs from prior art process in several significant respects. A zirconium-containing $ZrOCl_2$-based feed, which can be used in higher concentrations on smaller equipment is employed. The feed is preferably zirconyl chloride ($ZrOCl_2$) containing about 2.5M Zr and having a ratio of Cl/Zr of about 2.2. This preferred feed also contains about 2.6 lb/gal. $ZrO_2$, and has a total acidity of 5.5N and a specific gravity of 1.45. The zirconium feed point and the ammonium thiocyanate ($NH_4SCN$) feed points are separated, which allows a thiocyanate-free feed to contact solvent and strip about half of the zirconium from the solvent before the solvent feeds the stripper. Pulse columns with high mass transfer efficiency are used to carry out the separation. The effect of the foregoing improvements is substantial. Not only is the zirconium/hafnium separation process of the present invention simpler than prior art processes, but it also requires less equipment and lower in-process inventories of processing chemicals. In addition, the present process requires less time than previously available processes and costs less.

The process of the present invention is used to produce nuclear grade zirconium suitable for use as fuel rod cladding and the like. Zirconyl chloride ($ZrOCl_2$) is processed as described in detail hereinbelow to produce substantially hafnium-free $ZrO_2$, which is then available for further processing as required.

Zirconium and hafnium in the materials most suitable for processing according to the present method will usually be in the form of $ZrOCl_2$ and $HfOCl_2$. Typically there is substantially more $ZrOCl_2$ than $HfOCl_2$ in the materials to be processed to produce substantially hafnium-free zirconium. However, the hafnium must be separated from the zirconium, and any impurities, for example iron, removed before the zirconium will be suitable for use in nuclear applications.

Referring to the drawings, FIG. 1 is a flowsheet which illustrates schematically the zirconium/hafnium separation liquid-liquid circuit of the present invention. Solvent flow is represented generally by dashed lines, while other system liquids are represented by solid lines. Column 10 represents the iron extraction column. $ZrOCl_2$ feed is directed into the top of the column at arrow 12, and solvent is directed into the bottom of the column at arrow 14. The solvent particularly preferred for use in the present process is methylisobutyl ketone (mibK). However, other water immiscible organic solvents, such as ethyl or butyl ether and ethyl or butyl acetate, could also be used. The counter-current flow of $ZrOCl_2$ feed and solvent through the iron extractor column extracts ferric iron from the ZrOCl$_2$ feed. Iron-loaded solvent exits the column at 16 and is directed to a stripper (not shown) where the iron is stripped from the solvent so that the solvent can be reused and the iron may be recovered, if desired. The iron-free ZrOCl$_2$ feed is mixed with stripper aqueous at 18 and flows from the bottom of the columns 10 and 54 to a feed zone mixer-settler 20 along path 19.

The iron loaded solvent is preferably washed with water in the iron stripper (not shown) to produce an iron-free solvent which can be recycled to the iron extraction column or elsewhere in the circuit where solvent is required. Alternatively, the solvent can be steam stripped.

A feed zone mixer-settler 20 is used in the present process to separate the ammonium thiocyanate (NH$_4$SCN) from the zirconyl chloride feed. Zirconyl chloride feed, which is free of ammonium thiocyanate, is contacted by solvent in the mixer-settler 20 so that about half of the zirconium is prestripped by the solvent before the zirconium-containing stream 21 is contacted by NH$_4$SCN or enters the zirconium stripper. Ammonium thiocyanate (NH$_4$SCN) is introduced into the prestripped zirconium containing stream from the mixer-settler at 24, and this thiocyanate-containing stream is then directed into a hafnium extractor column 26 at 28 near the top of the column. Solvent is introduced near the bottom of the column at 30. The stream 34 from the hafnium extractor 26 is directed to the zirconium thiocyanate recovery column 54 at 35. Concentrated acid, preferably hydrochloric acid (HCl), is also directed into the zirconium thiocyanate recovery column along path 33 so that it combines with the hafnium extractor discharge prior to entering the column 54 at 35.

The hafnium extractor 26 is the key unit in the present process for producing nuclear grade zirconium. This unit must be operated successfully to achieve the 30 ppm Hf/Zr levels required for zirconium of the quality required for nuclear applications. Moreover, the operation of the hafnium extractor can have a significant effect on both the design of the other components in the circuit and the cost of the entire processing operation.

The feed zone mixer-settler 20 separates the NH$_4$SCN and the iron-free Zr feed/stripper recycle. This separation of the NH$_4$SCN and the Zr feed "pinches" hafnium extraction in the mixer-settler. A "pinch" is a zone in a column where the operating and equilibrium lines nearly touch. Because these two lines are almost in contact, many stages are required to produce small concentration changes. In the circuit of FIG. 1, the "pinch" limits the zirconium carried-into the stripper to levels characteristic of an infinitely long column.

Hafnium values are removed from the Zr- and SCN-containing stream in column 26, and this stream is then directed to a zirconium/thiocyanate recovery column 54, which will be described in detail below.

The prestripped zirconium/solvent stream 22 from the mixer-settler 20 enters a zirconium stripping column 36 toward the bottom of the column at 38. Dilute acid, preferably hydrochloric acid, is directed into the top of the zirconium stripping column 36 at 40.

The zirconium stripping column 36 is preferably operated with the organic stream continuous and the aqueous stream sprayed through a spray nozzle as will be described below in connection with FIG. 2. During stripping, chemical reactions take place that may be represented by the following:

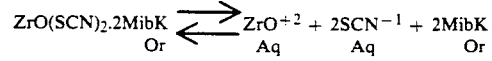

This is substantially the reverse of the reaction which occurs in the hafnium extractor 26.

The acidity in the zirconium stripper 36 is preferably high and within the range of about 3.0 to 3.5N HCl. As a result, a second reaction, which assists in the stripping, also occurs:

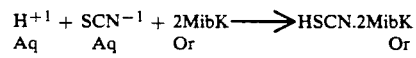

The high acidity drives thiocyanate from the aqueous, which helps to drive zirconium to the aqueous. Moreover, the high acidity returns to the solvent as HSCN some of the thiocyanate carried with the zirconium. The zirconium is then partially converted into zirconium oxychloro-thiocyanate:

$$ZrO(SCN)_2 + Cl^{-1} \rightarrow ZrOCl(SCN) + SCN^{-1}$$

The solvent stream 42 exits the top of the zirconium stripper and is directed to the bottom 44 of a hafnium scrubber column 46. Dilute acid, preferably about 3.5N sulfuric acid (H$_2$SO$_4$), is introduced into the top of the hafnium scrubber column at 48. Scrubber raffinate 50 is refluxed from the bottom of column 46 to the top of the zirconium extractor column 36 at 41. This part of the extraction process can be especially important to the operation of the zirconium stripper 36. Sulfate complexes preferentially with zirconium and prevents its extraction, which increases the separation factor between zirconium and hafnium. As a result, enhancement of the separation factor is quite dramatic at low zirconium concentrations.

The separation factor improvement is attributed to the following chemical reaction:

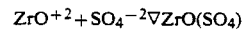

Hafnium does not participate in this reaction to the same degree as does zirconium. Moreover, as the concentration of zirconium increases, the fraction of zirconium that is tied up as sulfate decreases, and the separation factor will approach the sulfate free value. The foregoing reaction occurs both in the hafnium extractor 26 as well as in the zirconium stripper 36. However, the low SO$_4$/Zr ratio in the extractor makes the effect less noticeable there.

Control of the zirconium stripper can be monitored effectively by measuring the specific gravity of the aqueous stream in the stripper. The specific gravity of this stream may range from about 1.1 to 1.4. Complete control of the zirconium stripping process may be achieved by locating a point in the zirconium stripper 36 which yields an aqueous stream specific gravity of about 1.2 to 1.3.

The hafnium scrubber 46 is preferably operated with the organic phase flow continuous. Thiocyanate levels rise rapidly near the acid inlet 48 and then remain essentially the same along the length of the column. The hafnium aqueous concentrations increase down the column until they are about 10 to 20 times higher than the hafnium solvent concentrations. The performance of the hafnium scrubber 46 is controlled by the organic/aqueous ratio of the system and the normality of the scrub acid.

Scrubber solvent exits the top of the hafnium scrubber column 46 at 53 and is processed to recover thiocyanate. The entire scrubbed solvent stream 53 is regenerated to eliminate the scrubbed solvent from being a potential hafnium contamination source. Hafnium raffinate exits the bottom of the scrubber column 46 at 52. The hafnium raffinate is also desirably processed to recover thiocyanate.

A hafnium thiocyanate recovery column 70 is provided in the circuit to recover thiocyanate values in the stream 52 exiting the hafnium scrubber column 46. This hafnium raffinate 52 enters the top of column 70 at 72. MibK is directed into the column 70 at 74 and exits the top of the column at 76. The solvent from the hafnium thiocyanate recovery column 70 is then directed into the hafnium scrubber 46 at 77. Hafnium raffinate exits the bottom of column 70 at 78.

Hafnium thiocyanate recovery is controlled primarily by the residual thiocyanate levels in the regenerated mibK solvent and the organic/aqueous ratio. The raffinate is limited to a minimum of about 20% of the thiocyanate in the regenerated solvent. Therefore, solvent containing 0.05M SCN cannot produce a raffinate below 0.01M SCN. Controlled operation of hafnium thiocyanate recovery requires monitoring of the loaded solvent. The solvent joining the main solvent scrubber should have the same or a higher thiocyanate concentration than the main solvent stream. If the thiocyanate levels are weaker, the solvent will be diluted, and unnecessary scrubbing acid and ammonia consumption will be required.

Thiocyanate is recovered from the aqueous zirconium raffinate in zirconium thiocyanate recovery column 54. Solvent enters the bottom of the column 54 at 60, and exits the top of the column at 62. This solvent is then directed to the bottom of the hafnium extractor 26 at 30. The solvent leaving the recovery unit 54 at 62 is preferably loaded to 3.0M SCN. The lower free acidity in the system thus allows additional thiocyanate to be returned to the hafnium extractor 26 with the solvent. Zirconium raffinate, which may be processed further if desired, is discharged from the bottom of the recovery column at 64.

Ammonium thiocyanate is soluble in mibK. The thiocyanate levels in regenerated mibK are about 0.3M SCN after neutralization of the thiocyanic acid (HSCN) present in the solvent. If thiocyanate is to be recovered from zirconium raffinate and hafnium raffinate, the thiocyanate level should be, at most, 0.01M SCN and, preferably, 0.001M SCN. These low levels are achieved by washing the neutralized solvent with water or aqua ammonia. Water is the preferred washing material, since a small amount of ammonia could remain in the solvent and partially neutralize the raffinate. The reaction for the thiocyanate regeneration process preferred for use with the present invention is as follows:

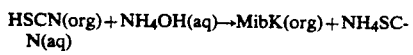

The zirconium/hafnium separation process described above requires at least six columns, the iron extractor 10, the hafnium extractor 26, the zirconium stripper 36, the hafnium scrubber 46, the zirconium thiocyanate recovery column 54 and the hafnium thiocyanate recovery column 70 to produce high quality, substantially hafnium-free nuclear grade zirconium. The present liquid-liquid separation circuit replaces the columns conventionally used with pulse columns. FIG. 2 illustrates schematically the essential features of a pulse column 80. A pulse column typically includes at least one expanded diameter disengaging section at one terminal end of the column. The pulse column 80 shown in FIG. 2 includes two disengaging sections 82 and 84 at each column terminal end. The disengaging section 82 includes a dispersed phase nozzle 86, an organic flow discharge nozzle 88, and an overflow nozzle 90. A vent 92 is provided at the end of the disengaging section 82. Inside the disengaging section 82 is a series of parallel coalescer plates 94. The opposite disengaging end 84 also includes a series of interior parallel coalescer plates 96 and a dispersed phase nozzle 98. An aqueous flow discharge nozzle 100 is also provided.

The central tube section 102 of the pulse column, which will vary in length depending upon the process taking place in the column, contains a plate stack 104. The plate stack 104 includes a number of plates 106 maintained in spaced parallel relationship along the interior length of the tube section 102. The spacing between the plates will preferably be selected according to the process to be conducted in the column.

The central tube section 102 also includes several nozzles: a dispersed phase nozzle 108, a pulse leg nozzle 110, an aqueous flow inlet nozzle 112, and an organic flow inlet nozzle 114.

The diameter of the pulse column central tube section 102 will be varied for each column in accordance with desired operating parameters and process results. The columns preferred for the present process have diameters that range from about 3 inches to about 14 inches. Likewise, the heights of the columns required for the zirconium/hafnium separation process described herein may range from 18 to 57 feet, depending upon the function to be performed by the column. The processing volume and ZrOCl and NH$_4$SCN concentrations will also determine the specific column diameters and heights. For example, the hafnium extractor column in a zirconium/hafnium separation system processing in excess of $2.0 \times 10^6$ pounds/year, using 2.5M ZrO$_2$ feed and 8.5M NH$_4$SCN should preferably be about 57 feet high and about 14 inches in diameter, while the iron extractor column should preferably be about 24 feet high and about 5 inches in diameter, and the zirconium stripper column should preferably be about 44 feet high and about 8 inches in diameter.

The dispersed phase in separation process such as that of the present invention is introduced into the column 80 through one of the dispersed phase nozzles 86 or 98 so that a small drop size is immediately established. Preferred for this purpose is a nozzle with a large orifice which generates the spray by spinning the fluid as it exits the nozzle, such as a Delavan Type WR, 29203-1, polypropylene nozzle.

It is preferred to add the continuous phase through a distributor because the distributor helps to prevent turbulence and channeling of the continuous phase as it enters the column.

The coalescer plates 94 and 96, which are mounted just inside the ends of the disengaging sections 82 and 84, redirect vertical flow into horizontal flow. A drop of fluid that has a settling velocity lower than the vertical velocity cannot be disengaged without a coalescer, such as plates 94 and 96. The vertical velocity is zero when the fluid flow is across the coalescer plates, which allows the smaller drops to fall to the plates, where they are captured. A droplet which contacts a coalescer plate 94,96 will coalesce and eventually return to the normal fluid flow path. The coalescer plate surfaces provide the interface required to coalesce droplets and thus functions like an expanded area disengaging zone. The coalescer plates 94 and 96 additionally assist in collapsing any emulsion flowing through the disengaging section.

The central tube section 102 of the column 80 includes the column counter-current zone. Although only one section 102 is shown in FIG. 2, a pulse column useful in the process of the present invention will typically include more than one section. Sampling points are desirable, at a minimum, at the column ends and midpoint. Sampling ports may also be located at other places on the column where monitoring of the counter-current flow is desirable. Once the required number of pipe sections have been assembled, cross fittings including nozzles, such as nozzles 108, 100, 112 and 114, and other necessary fluid connections are attached to each end of the pipe. One or more disengaging sections 82, 84 is then connected to the cross fittings at each end to form the top and bottom of column.

The central tube section 102 of the column is filled with a stack 104 of plates 106, which are perforated. A preferred assembly includes a stack of spaced, substantially parallel plates held together by zirconium wire with Teflon ® tubing sections over the zirconium wire to maintain the desired plate separation. The plates and tubing sections can be formed from a variety of different materials, including, for example, Teflon ®, polypropylene, zirconium and Mastelloy ®. The entire plate assembly is anchored to the column. One method of achieving this is to mount an oversize plate 107 in the column and secure the assembly 104 to the oversize plate. The plate stack 104 must be secured so that it will not move as the fluid is pulsed through the column. The exact spacing chosen for the plates 106 in the plate stack 104 will depend, in part, on the mixing energy required in the counter-current zone. Zones that require extra mixing energy will have closer plate spacing, while zones that easily emulsify will have wider plate spacing. Additionally, the plates 106 must be maintained in the stack, so that they are parallel and not tilted. Otherwise, channeling of the fluid flow will occur, and the counter-current flow required for effective liquid-liquid contact will not be achieved.

The plates in the column plate stack are perforated to allow the counter-current fluid flow required for the extraction or separation process to be performed in the column. The hole size in the plates should be small enough to prevent fluid flow when there is no agitation. In addition, the surface tension of the liquid should prevent gravity flow through the holes. A hole size of 2.5 to 3.0 mm will generally meet these criteria in a zirconium/hafnium separation circuit column suitable for the present invention. The open area of the perforated plate should not exceed about 45 to 50% of the total plate area. If the plate has a higher open area, the plate will not have sufficient mechanical strength to perform effectively.

The plates 106 must fit snugly against the inside column wall so that gaps larger in size than the plate perforations are not present between the plate and the column wall. If gaps exceeding the optimum perforation size are present, fluid will leak past the plate rather than flow through the plate perforations, and some of the counter-current contact required for the process to be performed by the column will be lost.

The pulse leg inlet nozzle 100, which is located near the organic or solvent inlet nozzle 114, is provided to introduce pulsing flow to the column. A pulse pump, such as a Pulsa metering pump (not shown) is connected to the nozzle 110 in a manner which prevents the formation of air pockets in the line and in the pump. For maximum control of the flow, the pump should produce a sine wave shaped displacement. Wave forms other than a sine wave are not as controllable. It is preferred that the pump stroke length be about 2 inches and adjustable between 10 and 300 cpm. These pump specifications should avoid both under agitation and flooding. Pulse columns respond differently to process conditions than do the packed columns of the prior art. The "hold-up", which is the fraction of dispersed phase, or droplets, in suspension, is the most important operating parameter in the performance of a pulse column. Hold-up, which preferably is always maximized, is controlled by the pulse rate. As a result, hold-up can be increased by increasing the pulsing. However, pulsing at levels that are too high causes the hold-up to increase to a level that will ultimately result in interface loss. Hold-up will be limited by flooding. The column typically floods at some intermediate position in the column, and the flood then expands until the dispersed phase exits the column with the continuous phase. Recovery from flooding occurs when the agitation rate and/or the flow rate is reduced.

The number of transfer units or stages of the pulse columns preferred for the present process varies with the flow rate. For example, a 20% increase in the flow rate will produce a 20% reduction in the number of transfer units. Conversely, the number of transfer units can be increased by reducing the flow. Reduction of the flow increases the contact time in the column and, thus, increases the mass transferred. In the prior art packed columns, the number of transfer units is almost independent of flow rate.

The pulse column operation of the stripper and scrubber organic continuous flow also differs from that of the prior art. In the pulse column employed in connection with the process of the present invention, the minor flow is dispersed. This benefits the control response of the system by keeping the phase residence times for each of the flows nearly equal. The interface is generally at the bottom of the column. As a result, surges in the major or solvent flow have little, if any, effect on the interface position. A solvent surge, therefore, will not produce a raffinate surge. Instead, unlike the prior art, a solvent surge in a pulse column like that shown in FIG. 2 will be transmitted to the next column and to the next in sequence until it is stopped by a surge tank. A solvent surge will eventually affect the interface by restricting the aqueous flow to the bottom of the column.

Flow stability can be controlled and maintained with the pulse column of FIG. 2 to an extent not possible with currently available columns. Generally, if the fluid flows to a column fluctuate, the organic/aqueous ratio and the hold-up of the dispersed phase will also vary, which is likely to result in unsatisfactory column performance. The pulse and pump motor speeds of the present pulse columns are preferably controlled so that the pumps operate below maximum speed. When additional flow is required, the pump speed can then be increased.

Because the flow varies essentially linearly with the speed of the pump motor, flow control to within 1 to 2% is easily achieved. Additionally, only a small change in flow is required to shift an interface back to its control position.

FIGS. 3a and 3b illustrate schematically the top view and the side view, respectively, of the feed zone mixer-settler 20 (FIG. 1) according to the present invention. The feed zone mixer-settler performs two functions: mixing and separating. The mixer section 120 provides sufficient mixing energy to prevent phase separation in the mixer. The settler section 122 receives the dispersion from the mixer and separates the two phases. A variable position jackleg (not shown) in the settler section 122 positions the interface.

The mixer section 120 is sized to provide mixing time for equilibration and to smooth process fluctuations. Generally, a residence time of about two minutes is adequate for the zirconium/hafnium separation process of the present invention. A mixing element 124, which is preferably a turbine type propeller, is provided in the mixer chamber 126 to stir and agitate the dispersion. The speed of the mixing element 124 is preferably controlled by a mixer motor (not shown) with a speed control. The dispersion enters the mixer chamber 126 through an inlet 128.

Baffles 130 separate the mixer chamber 126 from the settler chamber 132. A stack of coalescer plates 134 is provided in the settler chamber 132 to increase the coalescence rate. The preferred plate spacing is about 1 to 2 inches, and the plates are preferably tilted slightly to promote rapid removal of the coalesced materials from the dispersion. Vertical baffles 136 are provided to hold the dispersion on the plates. An organic overflow outlet 138 is provided in the settler section 122.

An aqueous underflow and adjustable interface control valve or "jackleg" 140 is also provided in the settler section 122. Since the jackleg is density controlled, density fluctuations can cause cycling by alternately holding aqueous and then dumping it. Minimizing the settler volume minimizes the magnitude of variation of the cycles.

The mixer-settler 20 may be made of glass or other materials conventionally used for liquid-liquid extraction circuits and may be mounted in a conventional steel pipe scaffold, if required. The settler volume should be similar to the mixer volume, but can also be greater than the mixer volume. The feed zone mixer/settler of the present invention is used to separate the ammonium thiocyanate and the feed/stripper raffinate injection points.

Although not shown in the drawings, the present Zr/Hf separation system also preferably includes a mixer-settler regeneration system which regenerates NH4SCN to produce an 8.5M SCN level in the regenerated thiocyanate. The regenerated solvent is preferably 0.001M SCN.

The zirconium/hafnium separation system of the present invention achieves significant efficiencies over currently available zirconium/hafnium separation systems. For example, the amounts of NH4SCN, HCl and H2SO4 required by the system disclosed herein are about half of what is currently required. As a result, in-process inventory requirements for these reagents are significantly lower than inventories required by currently available Zr separation processes. Additionally, equipment needs are reduced by about 30 to 50% below that used in conventional systems. The pulse columns used in the present system have about a 5- to 10-fold higher mass transfer efficiency than the packed columns now used for Zr/Hf separation systems. Preferably, the columns used in the present process are sized to provide about 30% more transfer units than the packed columns.

In the present Zr/Hf separation system, the entire scrubbed solvent stream is regenerated, which eliminates the scrubbed solvent from being a potential hafnium contamination source. The solvent leaving the zirconium raffinate thiocyanate recovery column 54 is preferably loaded to 3.0M SCN. Because the free acidity in the present system is lower than in currently available systems, additional thiocyanate can be returned to the extractor with the solvent. The substantial reduction in solvent inventory which results from the present process significantly increases the safety of the system and, concomitantly, significantly reduces any likelihood and severity of fire or explosion.

The major reductions in in-process inventories achieved by the present Zr/Hf separation process also greatly simplify the entire process. The entire liquid volume of the FIG. 2 system configuration is about 1,000 gallons, and the total solvent volume is about 500 gallons. The liquid volume of Zr/Hf separation processes currently used is about 7,000 gallons. The thiocyanic acid and ammonium thiocyanate in-process inventory required for the present process is about 1,000 pounds as compared with the 20,000 pounds currently needed. The total in-process zirconium inventory also drops to about 1,000 pounds as a result of the efficiencies achieved by the present invention.

Further, the present Zr/Hf separation system has a lower residence time than available systems. This residence time, which is defined as the ratio of the total volume to the total flow rate, is about one hour. Flexibility in operation of the system is possible with this low residence time. The feeds to the system can simply be shut off and the pulsing stopped for several days, if necessary. The columns will maintain their gradients for several days. The major factor limiting the exact length of time the system can be shut down and then restarted without emptying the columns and regenerating the solvent will be the rate and extent of thiocyanate decomposition.

The embodiment of the system shown and described in FIG. 1 requires columns that are sized relative to each other as shown in the drawing. The hafnium extractor 26 is the largest column. A disengaging section 27, like the disengaging sections 82 and 84 shown in FIG. 2, is required at each end of the column. The zirconium stripper 36 is somewhat smaller than the hafnium extractor 26 and requires only one disengaging section 37 at the top of the column 36. The hafnium scrubber 46 is shorter than the stripper 36 and requires a similar top disengaging section 47. The zirconium raffinate thiocyanate recovery column 54 requires expanded disengaging sections 55 at each end. The iron extractor column 10 requires an expanded disengaging section 11 only at the bottom of the column. The hafnium thiocyanate recovery column 70 is the smallest column and requires an expanded disengaging section 71 on one end only. The volume of the disengaging sections will vary, depending in part upon the size of the column. However, the disengaging sections 27 and 37 on the extractor and stripper, respectively, are preferably about 20 to 30 gallons. The feed zone mixer-settler 20 preferably has a 20 gallon mixer and a settler area of about 5 square feet.

Table I below sets forth the concentrations of zirconium (Zr), hafnium (Hf) and thiocyanate (SCN) and the total acidity at the top and bottom of each of the columns shown in FIG. 1. The total acidity, zirconium and thiocyanate concentrations in the zirconium stripper 36 are almost the same as those of a currently available process. The hafnium levels in the zirconium stripper 36 and the hafnium scrubber 46 are about twice as high as in known systems. Significant differences exist, however, between the concentrations in the present feed-zone mixer-settler 20, the hafnium extractor 26 and the zirconium raffinate thiocyanate recovery unit 54 and those in the corresponding columns employed by prior art processes. The solvent leaving column 54 contains about 0.2M Zr, which indicates that about one-third of the total zirconium loading to the extractor 26 occurs in thiocyanate recovery.

The concentration of thiocyanate in the solvent is about 3.0M, whereas prior to the present invention the solvent thiocyanate concentration was about 2.4M. The resulting lowered thiocyanic acid distribution coefficients in the hafnium extractor 26 allows additional thiocyanate to be returned to the extractor 26 in the solvent by way of the solvent. The total solvent flow to the hafnium extractor 26 will come from the zirconium thiocyanate recovery unit 54. As previously noted, all of the scrubbed solvent is regenerated, which eliminates the possibility of hafnium contamination of the solvent. Further, the solvent loading in the hafnium extractor 26 is about twice that currently used, and the organic-/aqueous ratio in the extractor 26 is about 1.0.

Solvent leaving the hafnium extractor 26 is pre-stripped in the mixer-settler 20, and the zirconium levels leaving the mixer-settler are similar to those currently used. The aqueous thiocyanate concentration leaving the mixer-settler is about 2.0M SCN. It is preferred in the present system to add NH4SCN to the hafnium extractor 26 feed to increase the thiocyanate concentration to 3.5M, which represents an increase of about 10% of the currently employed thiocyanate concentration at this point. Solvent leaving the hafnium raffinate thiocyanate recovery preferably has about the same thiocyanate level as the stripped solvent.

Zirconium concentrations in the extractor 26 are about twice as high as those of the known systems. However, this is not due to free acid, but results from the doubling of the zirconium metal concentration rather than from the presence of free acid. The acidity of the thiocyanate recovery raffinate is also about 50% higher, but this is also not due to the presence of free acid.

TABLE I

| Stream Description | | Zr, M | Hf, M | SCN, M | HSCN/ T Acid, N |
|---|---|---|---|---|---|
| Hafnium Scrubber (46) | | | | | |
| top | Solvent | 0 | 9E-05 | 2.02 | 2.02 |
| | H2SO4 | 0 | 0.00 | 0.00 | 3.50 |
| bottom | H2SO4 | 0.0004 | 0.11 | 0.71 | 3.61 |
| Zirconium Stripper (36) | | | | | |
| top | Solvent | 0.0007 | 0.019 | 2.10 | 2.06 |
| | HCl | 0 | 0 | 0 | 3.00 |
| | Str Acid | 0.0009 | 0.022 | 0.14 | 3.12 |
| bottom | Str Raff | 3.07 | 0.043 | 3.50 | 3.51 |
| Feed Zone MS (20) | | | | | |
| Inlet | Feed | 2.5 | 0.025 | 0.00 | 5.50 |
| | Feed Mix | 2.4 | 0.029 | 0.77 | 5.17 |

TABLE I-continued

| Stream Description | | Zr, M | Hf, M | SCN, M | HSCN/ T Acid, N |
|---|---|---|---|---|---|
| Outlet | Raff | 2.5 | 0.027 | 1.90 | 5.80 |
| | Solvent | 0.53 | 0.019 | 2.98 | 1.89 |
| Hafnium Extractor (26) | | | | | |
| top | M/S RaffThio | 0 | 0 | 8.50 | 0.00 |
| | Column Feed Mix | 1.87 | 0.02 | 3.55 | 4.35 |
| | Solvent | 0.71 | 0.018 | 3.65 | 2.20 |
| bottom | Raff | 1.47 | 9E-05 | 2.81 | 3.65 |
| | Org Feed | 0.2 | 0 | 3.00 | 2.30 |
| | Scr Solvent | 0 | 0 | 2.20 | 2.02 |
| Zr Raff Thio Recovery (54) | | | | | |
| top | HCl | 0 | | 0.00 | 10.00 |
| | Aq Feed | 1.24 | | 2.38 | 4.62 |
| | Solvent | 0.20 | | 3.00 | 2.30 |
| bottom | Raff | 1.36 | | 0.001 | 2.87 |
| | Solvent | 0 | | 0 | 0 |

The present process requires the precipitation of zirconium sulfate from high ZrO2 concentration, low acidity raffinates to produce usable nuclear grade zirconium. The precipitation reaction for 5:2 zirconium sulfate is:

$$5Zr^{+2} + 2(SO_4)^{-2} \rightarrow (ZrO)_5(OH)_6(SO_4)_2 \cdot xH_2O$$

The compound produced according to this reaction has an equivalent acidity of 0.8 [H]/Zr. Hence, the minimum acidity that a raffinate should have is about 0.8 [H]/Zr. The raffinate produced by the zirconyl chloride (ZrOCl2) separation process described herein meets this criterion.

The zirconium/hafnium separation process of present invention has been described with respect to preferred embodiments. It is evident that many alterations, modifications and variations will be apparent to those skilled in the art in light of the foregoing description. Accordingly, it is intended to embrace all such alternatives, modifications and variations that fall within the spirit and scope of the appended claims.

INDUSTRIAL APPLICABILITY

The zirconium/hafnium separation system of the present invention will find its primary applicability in the production of nuclear grade zirconium suitable for use in nuclear fuel rods. However, the system of separating hafnium and zirconium described herein can also be used to separate zirconium and hafnium where it is desired to obtain high quality zirconium or hafnium by a process that is simpler, faster and less costly than available prior art processes.

I claim:
1. A process for separating zirconium values from hafnium values to produce nuclear grade zirconium, comprising:
   (a) extracting the iron from an aqueous ZrOCl2 feed with an organic solvent;
   (b) directing the iron-free aqueous ZrOCl2 feed mix to a mixer-settler where said feed is mixed with raffinate from a zirconium stripper;
   (c) contacting the iron-free aqueous ZrOCl2 feed/zirconium stripper raffinate mix with an organic solvent in the mixer settler to prestrip a quantity of zirconium from the zirconium loaded solvent and to produce a mixer-settler raffinate zirconium feed;
   (d) adding a thiocyanate-containing aqueous feed to the mixer-settler raffinate zirconium feed and ex- tracting hafnium values from the zirconium-thiocyanate containing feed thus formed in the presence of an organic solvent;

(e) stripping zirconium values from the zirconium-thiocyanate-containing solvent in the presence of a weak concentration of a first acid;

(f) scrubbing the stripped feed in the presence of a second acid to further remove hafnium values from said stripped feed to produce a scrubber raffinate and thiocyanate-containing solvent;

(g) refluxing said scrubber raffinate to step (e) and extracting thiocyanate values from the scrubber raffinate;

(h) recovering thiocyanate from the Hafnium extracted feed in the presence of a solvent and a high concentration of said first acid and (i) regenerating said solvent.

2. The process described in claim 1, wherein said solvent is methylisobutyl ketone, said first acid is hydrochloric acid and said second acid is sulfuric acid.

3. The process described in claim 2, wherein the thiocyanate in the thiocyanate-containing feed of step (d) is added in the form of $NH_4SCN$.

4. The process described in claim 3, wherein the aqueous $ZrOCl_2$ feed of step (a) contains about 2.5M Zr.

5. The process described in claim 4, wherein the concentration of thiocyanate in the solvent of step (i) is about 0.01 to 0.001M SCN.

6. The process described in claim 5, wherein the zirconium concentration in the solvent recycled in step (h) is about 0.2M Zr.

7. The process described in claim 3, wherein the addition of $NH_4SCN$ increases the concentration of thiocyanate to about 3.5M SCN.

8. The process described in claim 1, further including the step of regenerating the thiocyanate from the thiocyanate-containing solvent.

9. The process described in claim 1 wherein zirconium sulfate ($ZrSO_4$) is precipitated from said zirconium raffinate.

10. The process described in claim 1, wherein the ratio of organic to aqueous in the extraction step of step (d) is about 1.0.

11. A liquid-liquid separation circuit for separating the hafnium from the zirconium in an aqueous $ZrOCl_2$ feed in the presence of thiocyanate, acid and an organic solvent to produce a zirconium raffinate having an acidity of at least 0.8 [H]/Zr, said separation circuit including a plurality of fluidically interconnected column means for separating said hafnium from said zirconium, each said column means including organic solvent feed means for directing organic solvent into one end of said column means and aqueous feed means for directing an aqueous liquid into an opposite end of said column means, said plurality of column means including at least iron extraction column means for removing iron from said $ZrOCl_2$ feed, hafnium extraction column means for extracting hafnium values from a zirconium-thiocyanate-containing feed; zirconium stripping column means for stripping zirconium values from zirconium-thiocyanate-containing solvent and producing a stripper raffinate; hafnium scrubbing column means for further removing hafnium values from feed produced by said zirconium stripping column means; zirconium-thiocyanate recovery column means fluidically connected directly to said hafnium extraction column means for producing a zirconium raffinate; and hafnium-thiocyanate recovery column means fluidically connected directly to said hafnium scrubbing column means for producing hafnium raffinate; said circuit further including zirconium prestripping means fluidically interconnected to said iron extraction column means, said hafnium extraction column means, said zirconium stripping column means and a source of thiocyanate for prestripping a quantity of zirconium from a mixture of iron-free $ZrOCl_2$ feed and stripper raffinate.

12. The liquid-liquid separation circuit described in claim 11, wherein said circuit further includes thiocyanate regeneration means for regenerating thiocyanate as $NH_4SCN$.

13. The liquid-liquid separation circuit described in claim 11, wherein said zirconium prestripping means comprises feedzone mixer-settler means for separating a feed point of said thiocyanate source from a feed point of said $ZrOCl_2$ feed and removing zirconium values in the absence of thiocyanate.

14. The liquid-liquid separation circuit described in claim 13, wherein each of said plurality of column means includes at least one disengaging zone means for receiving a dispersed phase of a liquid entering said column means.

15. The liquid-liquid separation circuit described in claim 14 wherein each said organic solvent feed mans and each said aqueous feed means includes nozzle means for introducing a dispersed phase of said organic solvent and said aqueous liquid into said disengaging zone means; coalescer means for redirecting fluid flow inside said column means; plate stack means for controlling the countercurrent flow of said organic solvent and said aqueous liquid through said column means; and pulse means for controlling mass transfer into said column means in accordance with a sine wave displacement.

16. The liquid-liquid separation circuit described in claim 15, wherein the organic solvent feed means of said zirconium stripping column means and said hafnium scrubbing column means continuously feed organic solvent into said zirconium stripping column means and into said hafnium scrubbing column means.

17. The liquid-liquid separation circuit described in claim 11, wherein each said column means comprises a high mass transfer efficiency pulse column.

* * * * *